United States Patent [19]

Pan et al.

[11] Patent Number: 4,776,609
[45] Date of Patent: Oct. 11, 1988

[54] LINKAGE TYPE OF ANTI-DIVE SUSPENSION SYSTEM

[75] Inventors: Jyh-Shena Pan; Jih-Tzang Luo, both of Hsin Chu Hsien, Taiwan

[73] Assignee: Industrial Technology Research Institute, Hsin Chu Hsien, Taiwan

[21] Appl. No.: 73,287

[22] Filed: Jul. 14, 1987

[51] Int. Cl.$^4$ ............................................. B60G 21/00
[52] U.S. Cl. ..................................... 280/703; 180/219; 280/276
[58] Field of Search ................. 280/703, 276; 180/219

[56] References Cited

U.S. PATENT DOCUMENTS

| | | | |
|---|---|---|---|
| 2,596,411 | 5/1952 | Jordan | 280/276 |
| 3,989,261 | 11/1976 | Kawaguchi | 280/276 |
| 4,159,123 | 6/1979 | Petty | 280/276 |
| 4,437,678 | 3/1984 | Schultz | 280/276 |

Primary Examiner—Kenneth R. Rice
Attorney, Agent, or Firm—Cushman, Darby & Cushman

[57] ABSTRACT

It is a linkage type of anti-dive suspension mechanism for a wheel; this mechanism is particularly designed for the front wheel of a motorcycle so as to prevent the head portion of cycle from diving downwards upon braking. The main structure of the mechanism comprises a linking rod being connected between the brake disk and the fork. The prime feature of the mechanism is that the center lines of the linking rod, the brake disk, the rocking arm of the front wheel and the form from a skew quadrilateral-shaped four-rod linkage mechanism; further, the intersected point of the extension lines of the center line of the linking rod and the center line of the rocking arm is fell behind the brake disk in the direction of the tail of the cycle.

3 Claims, 9 Drawing Sheets

LINKAGE TYPE OF ANTI-DIVE SUSPENSION SYSTEM

BACKGROUND OF THE INVENTION

Since the motorcycle is a practical and convenient transportation, a complete suspension system for motorcycle is rather important so as to provide the motorcyclist with a comfortable ride. A suspension system can isolate all the shock effect of motorcycle during driving. The general motorcycle would have a bounce or a pitching effect upon driving straight forwards on a rough road, or during a acceleration or deceleration moment. A sudden braking action would impose upon the front wheel of a motorcycle a strong force, thus, causing the head portion of the motorcycle to drive.

The conventional suspension mechanisms used in the front wheel of a motorcycle are the telescope type, the trailing-link type, and the leading-link type, etc. The telescope type and the trailing-link type would cause the head portion to dive during braking. Particularly in the trailing-link type, in addition to the inertia force, the braking moment causing the wheel rooking arm to rotate; thus cause a more serious dive. In the motorcycle that uses a leading-link type of suspension mechanism, it usually has a greater braking moment than the inertia force; as a result, the head portion would move upwards.

Either the moving upward effect would cause the motorcyclist to feel uncomfortable. Some motorcycle manufacturers have made a careful study to improve the aforesaid drawbacks, but there is no, as far, any leading-link type of suspension mechanism having an anti-dive mechanism being known and shown in the merket.

SUMMARY OF THE INVENTION

In view of the aforesaid drawbacks, the inventor has, through repeated studies and experiments, developed the present invention, as the linkage type of Anti-dive Suspension Mechanism for a leading-link type suspended front wheel.

This invention can prevent the motorcycle from diving or moving upwards upon putting a brake on the front wheel there of, and that mechanism is to be mounted on the front wheel, of which the wheel spindle and the shock absorber are mounted in front of the front fork.

The prime feature of the present invention is that the center lines of linking rod, the brake disk, the rocking arm and the front fork form into a skew quadrilateral, i.e. a four-rod linkage mechanism. The interested point of the center lines of the linking rod and the rocking arm is fell behind the brake disk.

Another feature of the present invention is that the contained angle formed by the center line of the linking rod and the center line of the rocking arm may be designed smaller to minimize the upward force for offsetting a smaller downward force of the head portion; or designed bigger to generate a stronger upward force, for offsetting a greater downward force of the head portion, i.e. The contained angle may be suitable adjusted so as to meet various requirement.

DETAILED DESCRIPTION

Figure 1:
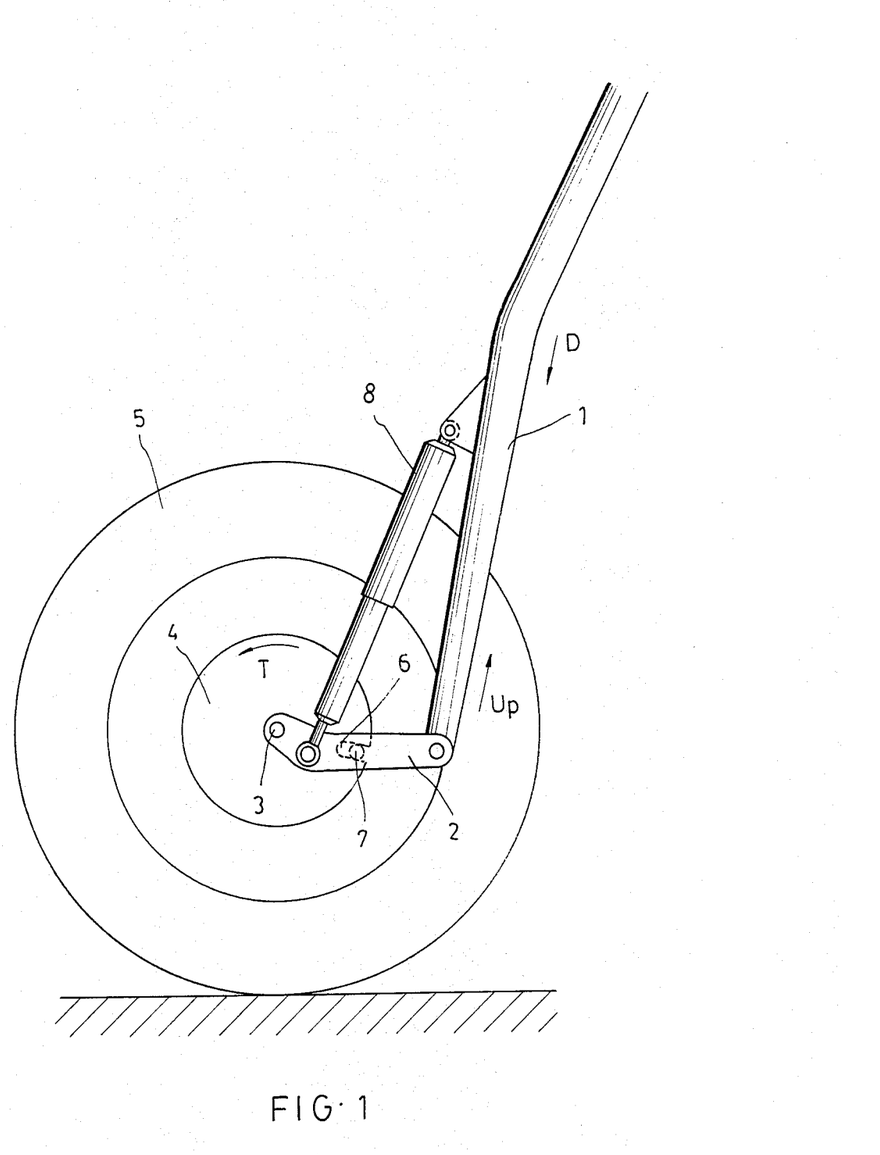
FIG. 1 is a perspective view of the conventional leading-link suspension mechanism.

Referring to FIG. 1, there is a perspective view showing a conventional leading-link suspension mechanism, in which the lower end of the front fork 1 is pivotally connected with the rocking arm 2 of the front wheel; the other end of the rocking arm 2 is mounted on the wheel spindle 3; the spindle 3 combines the brake disk 4 and the wheel 5 together. The brake disk 4 has a slat 6 for receiving a stud 7 on the rocking 2 so as to prevent the brake disk 4 from rotating. A shock absorber 8 is mounted between the rocking arm 2 and the front fork 1. Upon putting on the brakes, a torque T is generated to cause the rocking arm 2 to move upwards, i.e. an upward force Up is generated so as to resist the downward movement of the front fork 1 caused by a downward force D result from the inertia effect. But in fact, the upward force Up is usually greater than the downward force D to cause the head portion of the motorcycle to move upwards and to have the motorcyclist feel uncomfortable.

Figure 2:
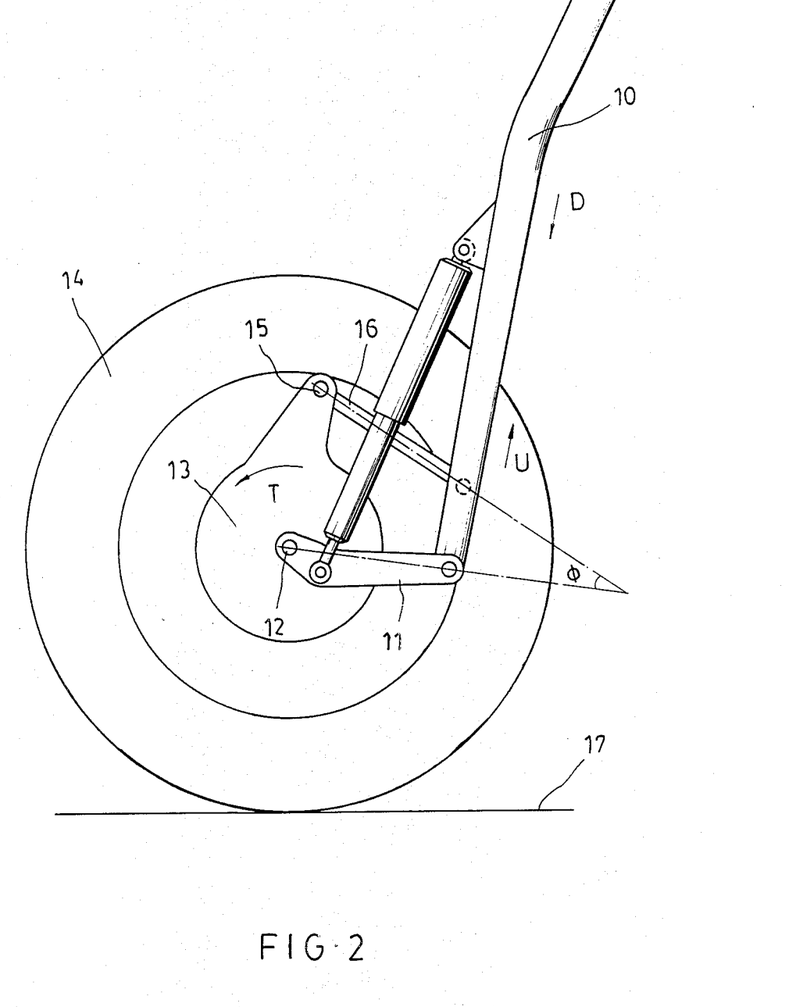
FIG. 2 is a perspective view of the embodiment according to the present invention.

FIG. 2 illustrates an embodiment of the present invention, in which the lower end of the front fork 10 links with one end of the rocking arm 11 of the front wheel; the other end of the rocking arm 11 is mounted on the wheel spindle 12, which combines the brake disk 13 and wheel 14 together. The outer edge of the brake disk 13 is furnished with a connecting lug 15, which links with one end of a linking rod 16; the other end of the linking rod 16 is connected the front fork 10 at a position above the rocking arm 11; in other words, the aforesaid four parts (the front fork 10, the linking rod 16, the brake disk 13 and the rocking arm 11) from a four-rod linkage mechanism resembling a skew quadrilateral. The center line formed by the both ends of the linkage rod 16 and the center line formed by the both ends of a rocking arm 11 of the front wheel are crossed at a point behind the brake disk 13 toward the tail of the motorcycle.

Upon putting a brake on the front wheel during the motorcycle running leftwards as shown in FIG. 2, both the rotary inertia of the front wheel 14 and the friction force between the wheel 14 and the ground surface 17 will result a counter-clockwise torque T to exert on the wheel center; that torque T will, through the rocking arm 11 and the linking rod 16, be applied to the front fork 10 to convert into an upward net resultant force U, which can offset the downward force D of the head portion of motorcycle to be generated upon braking as a result of the inertia effect. In that case, the head portion of the motorcycle would neither go downwards nor upwards.

Figure 3:
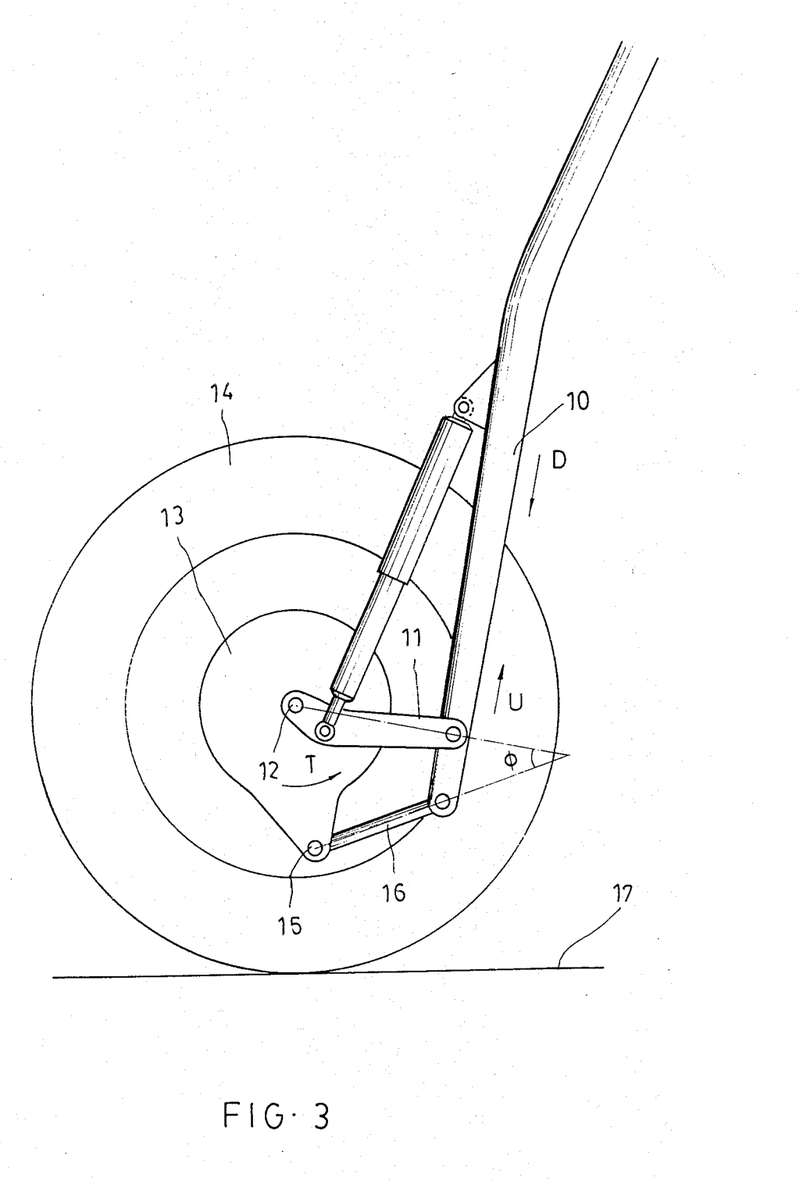
FIG. 3 is a perspective view of another embodiment according to the present invention.

FIG. 3 illustrates another embodiment of the present invention; the difference between the embodiment shown in FIG. 2 and that shown in FIG. 3 is the position of the linkage rod 16, which is mounted under the rocking arm 11. According to FIG. 3, the front fork 10, the linking rod 16, the brake disk 13 and the rocking arm 11 of the front wheel are formed into another skew quadrilateral linkage mechanism to provide the same function as that shown in FIG. 2.

Figure 4:
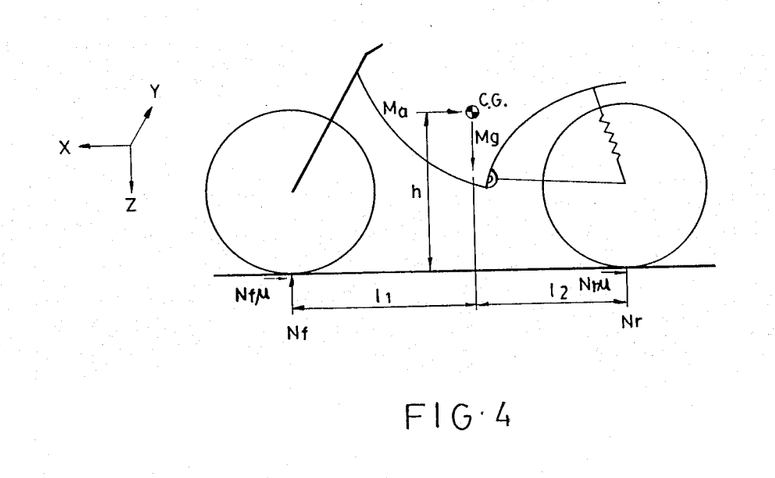
FIG. 4 is a schematic diagram of a motorcycle, showing the force applied thereto during braking.

The theory of the present invention is analyzed, in accordance with the load distribution and force transfer during a motorcycle being braked, as follow:

FIG. 4 is a schematic diagram of a motorcycle, showing the force applied thereto druing braking, in which:

C.G.=the instant gravity center;
$M_a$=braking force (a=braking deceleration);
$M_g$=gravity (9=acceleration of gravity);
$N_f$, $N_r$=the load distribution on the front wheel and the rear wheel;
$\mu$=static friction coefficient
$l_1$=the horizontal distance between the instantaneous gravity center and the point of the front wheel touching the ground;
$l_2$=the horizontal distance between the instantaneous gravity center and the point the rear wheel touching the grount;

Supposing the static friction coefficient of both the front and rear wheels being $\mu$ during braking, the friction forces $f_f$, $f_r$ of the front and rear wheel would be:

$$f_f = N_f \mu \quad (1)$$

$$f_r = N_r \mu \quad (2)$$

Since there is a balanced relation between the aforesaid two friction forces, three equations can be obtain as follows:

$$\Sigma F_x = 0 \rightarrow f_f + f_r = M_g \quad (3)$$

$$\Sigma F_z = 0 \rightarrow N_f = N_r = M_g \quad (4)$$

$$\Sigma M_c = 0 \rightarrow N_f l_1 = N_r l_1 + (N_f + N_r) \quad (5)$$

therefore, $$N_f = \frac{l_1 + \mu \cdot h}{l_1 + l_2} M_g \quad (6)$$

$$N_r = \frac{l_1 - \mu \cdot h}{l_1 + l_2} M_g \quad (7)$$

Therefore, the increasing load to be applied to the front wheel during braking i.e. the aforesaid downward force D, would be:

$$N_f = \frac{\mu \cdot h}{l_1 + l_2} M_g. \quad (8)$$

Figure 7A:
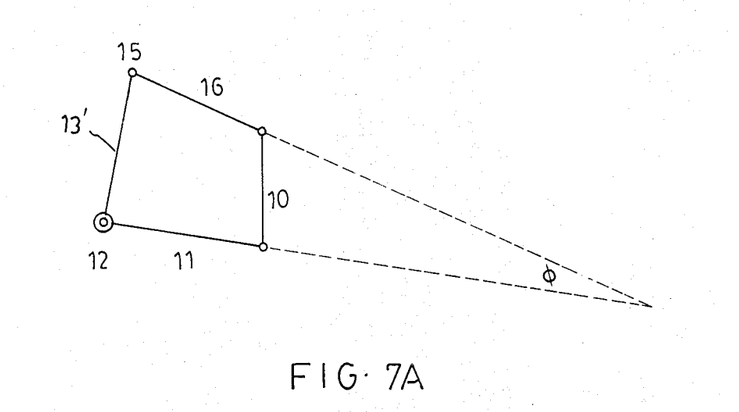
FIG. 7A is a schematic diagram of the four-rod linkage of the present invention.
Figure 7B:
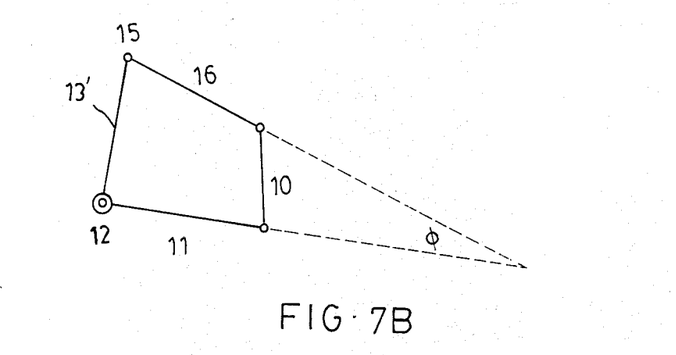
FIG. 7B is a schematic diagram of the four-rod linkage of the present ivention, having different sizes.
Figure 7C:
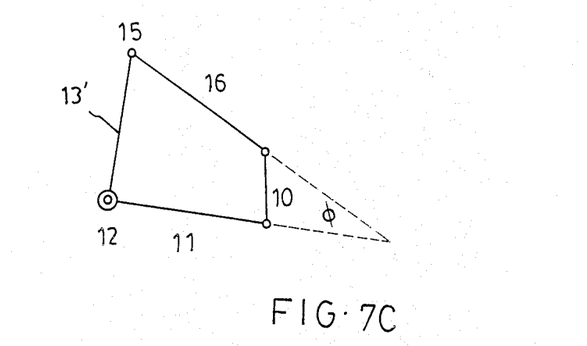
FIG. 7C is a schematic diagram of another embodiment of the four-rod linkage of the present invention.
Figure 8:
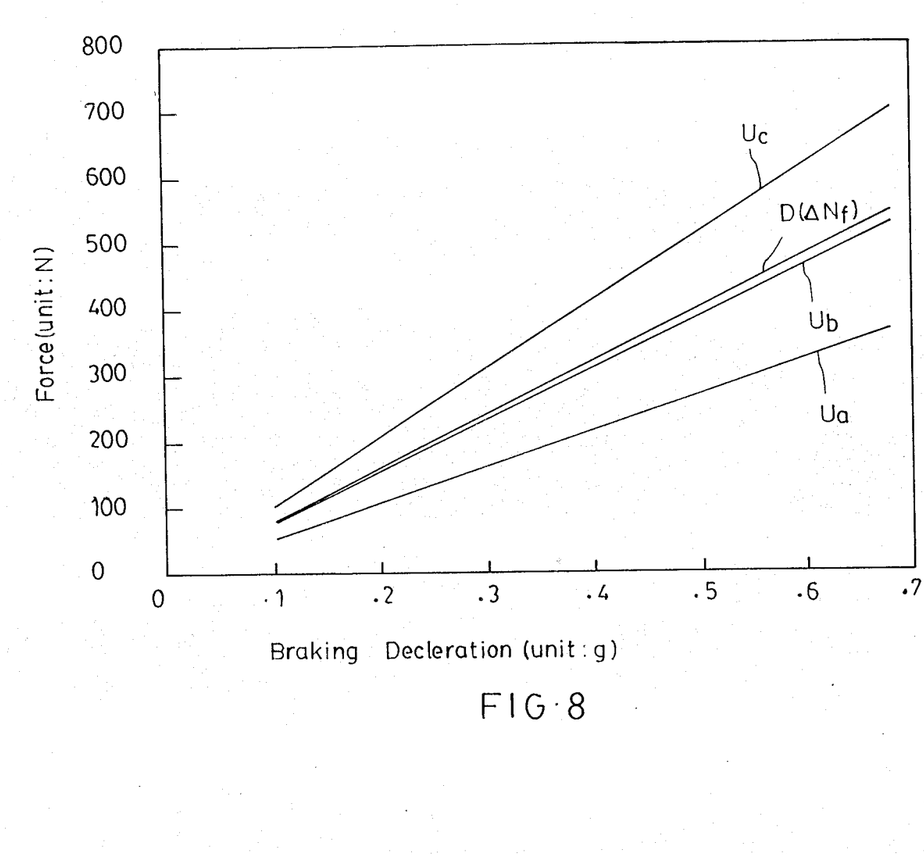
FIG. 8 is a diagram showing the relation between the upward force and the braking deceleration when putting a brake on the front wheel, which is mounted with one of the four-rod linkages as shown in FIGS. 7A, 7B and 7C.

Supposed that
h=690 mm, $l_1$=744 mm, $l_2$=456 mm,
$M_g$=143 kg, as calculating the relation between the braking deceleration a and $\Delta N_f$ by means of the equation (8), the line D as shown in FIGS. 7 and 8 will be obtained.

Figure 5:
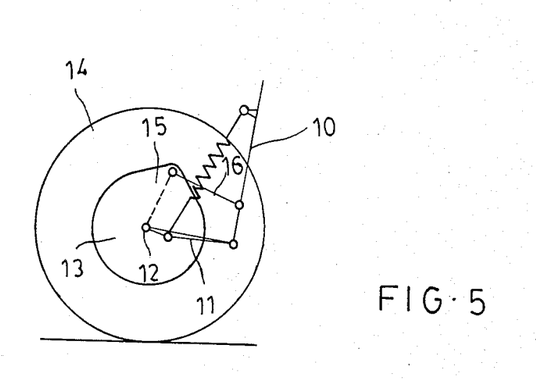
FIG. 5 is a schematic diagram of the embodiment shown in FIG. 2.
Figure 5A:
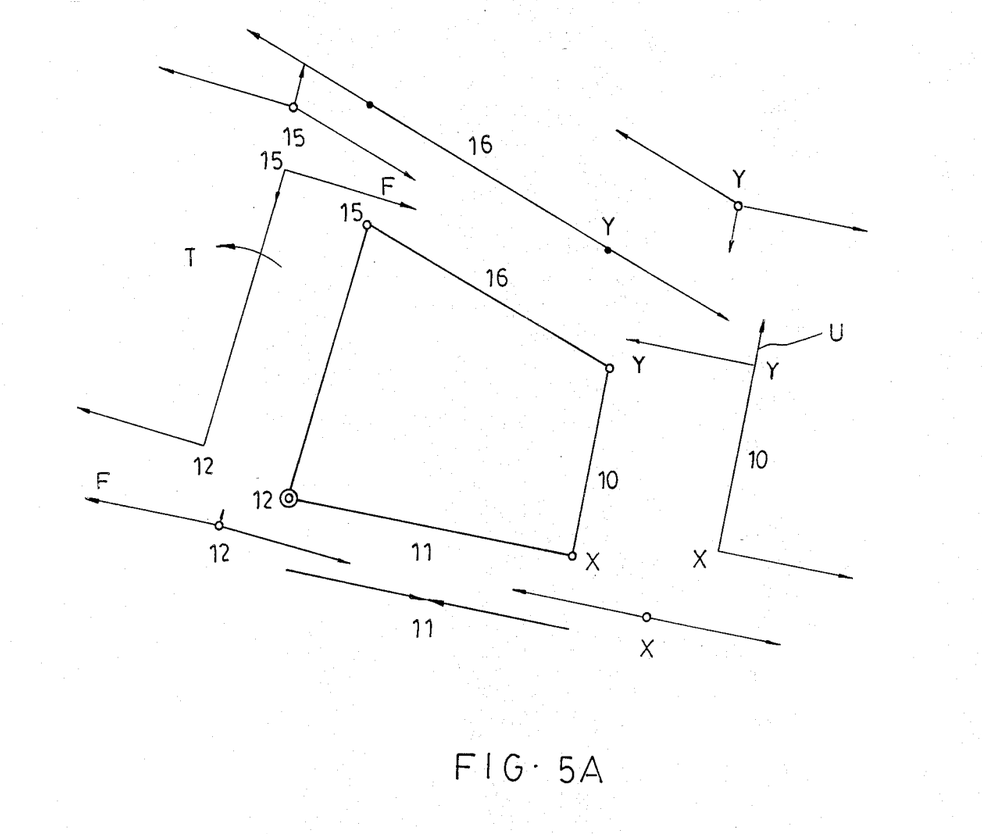
FIG. 5A is the force analysis diagram of FIG. 5.

The force applied to the embodiment as shown in FIG. 2 can be analyzed by means of the free body method. Referring to FIG. 5, there is a schematic diagram representing the embodiment shown in FIG. 2; the force analysis in FIG. 5 is shown in FIG. 5A, in which the couple generated by the torque T is F=T/l; "l" is the length of the rocking arm; then the upward force U is obtained. Where U<F, and U=0 (downward force), and therefore it can meet the requirement of not causing the head portion to move downwards or upwards.

Figure 6:
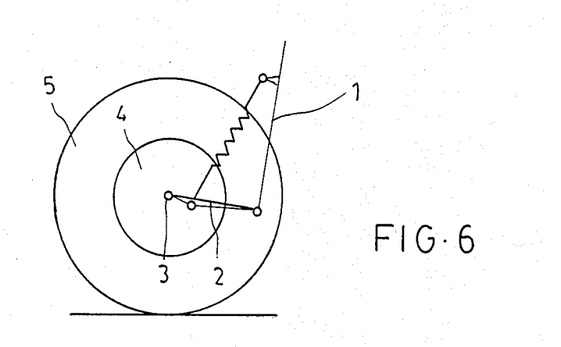
FIG. 6 is a schematic diagram of a conventional leading-link suspension mechanism.
Figure 6A:
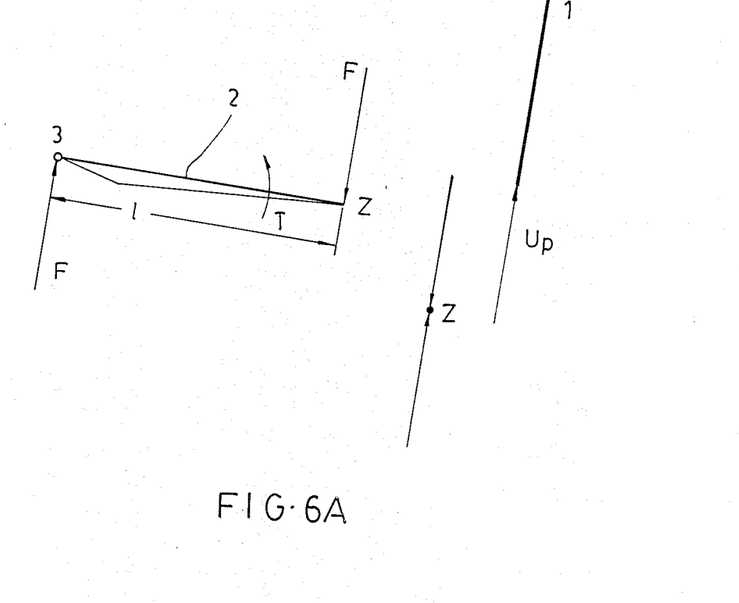
FIG. 6A is the force analysis diagram of FIG. 6.

Further, a conventional leading-link type of suspension mechanism with the same size is used as a comparative example also shown and made analysis by means of the free-body method in FIGS. 6 and 6A. In FIG. 6A, $$F = \frac{T}{l};$$

l=the length of the rocking arm, and the upward force Up is diagrammatically obtained. where Up=F, is much greater than being required, the head portion of the motorcycle will move upwards. Though the upward force Up may be reduced by increasing "l", the whole structure and the appearance of the wheel suspension mechanism will be affected, and it is deemed impractical.

On calculation, the moment T generated during braking includes the moment of inertia and the friction force to the wheel, can be obtained with the following equation:

$$T = I_w \cdot \frac{a}{R_w} + N_f \cdot \mu \cdot R_w, \quad (9)$$

in which: $I_\omega$=the rotary inertia of the wheel; $R_\omega$=the effective radius of the tire.

If only the front wheel is put on brake the static friction coefficent, $$\mu = \frac{M}{N_f} \cdot a.$$

Figure 9:
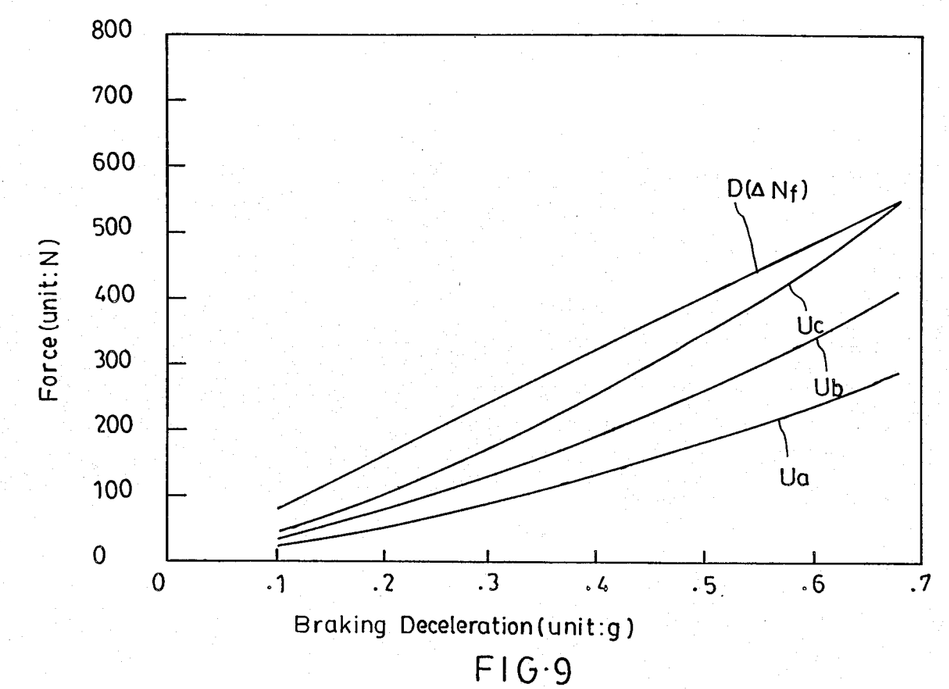
FIG. 9 is a diagram showing the relation between the upward force and the braking deceleration upon putting a brake on both the front and rear wheels, which are mounted with one type of the four-rod linkages as whowing in FIGS. 7A, 7B and 7C.

If both the front and rear wheels are put on brake, and both have the same static friction coefficient $\mu$, then:

$$\mu = \frac{a}{g}.$$

as shown in FIGS. 7A, 7B and 7C, in which the rods 13' formed on the brake disks and the rocking arms 11 of the front wheels are maintained in the same sizes, but the linking rods 16 and the rod 10s formed on the front forks are different in sizes. FIG. 7A has the smallest contained angle $\phi$; FIG. 7C has the largest contained angle $\phi$. By means of equation (9), the relationship among the downward force D, the upward forces U and the braking deceleration a can be obtained as shown in FIGS. 8 and 9. FIG. 8 illustrates the state upon the front wheel being put on brake, while FIG. 9 illustrates the state upon both the front and rear wheels being put on brake. In the aforesaid Figs., line Ua represents the curve of the upward force generated according to the structure shown in FIG. 7A, and so forth; D represents the downward force ($=\Delta N_f$). It is apparent from the aforesaid two Figs. that the larger the contained angle $\phi$ is, the higher the upward force will be, and vice versa.

In other words, whenever the contained angle formed by the center line of the linking rod 16 and the conter line of the rocking arm 11 is changed, the upward force U will be varied accordingly.

Briefly, the linkage type of anti-dive suspension mechanism according to the present invention can show the same result both from the view point of force analysis and from the practical experiment, i.e., as long as the intersected point of the extension lines of the linking rod 16 and the rocking arm 11 falls behind the brake disk toward the tail of the cycle, a suitable upward force U will be generated to offset th downward force D during braking.

The aforesaid embodiment may be changed and modified by anyone who is skilled in the art without deviation from the spirit and scope of the present invention as claimed in the appended claims.

We claim:

1. A linkage type of anti-dive suspension mechanism for the front wheel of a cycle comprising:
   a fork, of which the top portion is connected with the head portion of the cycle, while the lower portion is connected, through a rocking arm, with a spindle of a wheel;
   a rocking arm of the wheel, of which one end is connected with said fork, while the other end is connected with said wheel spindle so as to limit the relative motion between said wheel and said fork;
   a brake disk, which is pivotally joined on said wheel spindle, having a connecting lug on an outer edge of said brake disk which is connected, via a linking rod, with said fork; and
   a linking rod being connected between said brake disk and said fork; where the aforesaid members being linked and formed into a four-rod linkage mechanism; and the intersecting point of the extension lines of said rocking arm and said linking rod cross at a point behind said brake disk and said fork toward the direction of the tail of the cycle.

2. A linkage type of anti-dive suspension mechanism as in claim 1, wherein said linking rod is linked to said fork at a position on said fork closer to the head portion of the cycle than the position at which said rocking arm is linked to said fork.

3. A linkage type of anti-dive suspension mechanism as in claim 1, wherein said rocking arm is linked to said fork at a position on said fork closer to the head portion of the cycle than the position at which said linking rod is linked to said fork.

* * * * *